(No Model.)

J. E. OHLSON.
POTATO PLANTER.

No. 398,071. Patented Feb. 19, 1889.

WITNESSES:
John M. Deemer
C. Sedgwick

INVENTOR:
J. E. Ohlson
BY Munn & Co.
ATTORNEYS

UNITED STATES PATENT OFFICE.

JOHN E. OHLSON, OF ROCKFORD, WASHINGTON TERRITORY.

POTATO-PLANTER.

SPECIFICATION forming part of Letters Patent No. 398,071, dated February 19, 1889.

Application filed August 30, 1888. Serial No. 284,159. (No model.)

*To all whom it may concern:*

Be it known that I, JOHN E. OHLSON, of Rockford, in the county of Spokane and Territory of Washington, have invented a new and Improved Potato-Planter, of which the following is a full, clear, and exact description.

This invention relates to machines for planting potatoes, and has for its object to provide a machine of this kind which will be simple, effective, and durable.

The invention consists in a potato-planter constructed and arranged as hereinafter described and claimed.

Reference is to be had to the accompanying drawings, forming a part of this specification, in which similar figures of reference indicate corresponding parts in both the views.

Figure 1:
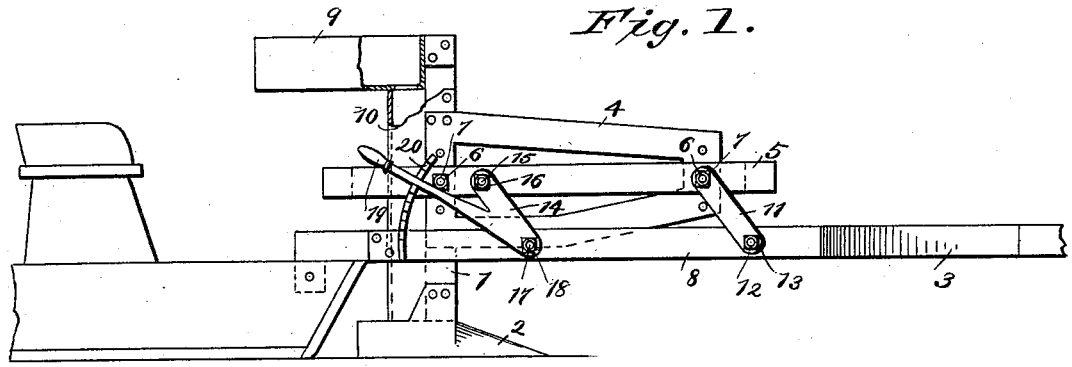
Figure 2:
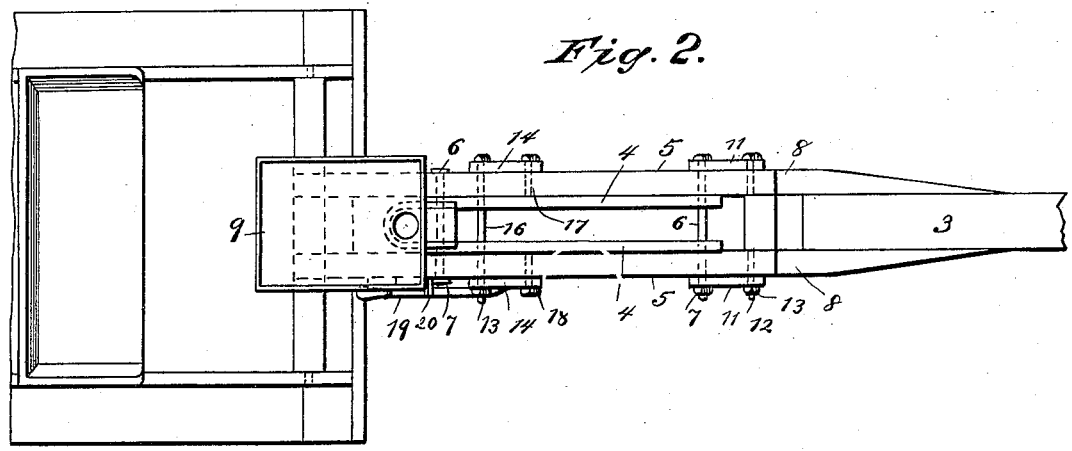

Figure 1 is a side view, partly broken away, of a potato-planter constructed in accordance with this invention; and Fig. 2 is a plan view thereof.

In carrying out this invention a standard, 1, having a plow, 2, secured to its lower end, extends through the forked end of a pole, 3, and is provided with forwardly-projecting frames 4. At the sides of standard 1 and frames 4 are located horizontal strips 5, held in place by bolts 6 and nuts 7, the bolts 6 passing through strips 5, frames 4, and standard 1. The strips 5 extend over the arms 8 of the forked end of the pole, and the lower portion of frames 4 is movable vertically between the arms 8. At the top of standard 1 is located a seed-box, 9, provided with a discharge-chute, 10, extending downward in rear of the standard 1, and having its lower open end adjacent to the rear of the plow 2. To adjust the plow for operation at different depths, links 11 are mounted at one end on the forward bolt, 6, and held in place by nut 7, and at the other end on a bolt, 12, extending through arms 8 of pole 3 and secured by a nut, 13, and links 14, mounted at one end on a bolt, 15, extending through strips 5 and secured by a nut, 16, and at the other end on a bolt, 17, extending through arms 8 and secured by a nut, 18. To raise or lower the strips 5, carrying-frames 4, standard 1, and plow 2, one of the links 14 is formed with a lever-handle, 19, which adjustably engages a curved toothed bar, 20, mounted on one of the arms 8. By adjusting the lever in engagement with bar 20 the plow 2 may be held to cut at any desired depth.

By means of a potato-planter constructed as herein set forth a simple and effective device is provided, which will not get out of order and may be readily adjusted.

Having thus fully described my invention, I claim as new and desire to secure by Letters Patent—

1. A potato-planter constructed with a vertically-adjustable frame and standard mounted on the forked end piece of the pole of the machine, a seed-box and discharge-chute on the standard, a plow on the lower end of the standard adjacent to the lower end of discharge-chute, and pivoted links connecting the vertically-adjustable frame with the forked end of pole, a curved toothed bar on the latter, and a lever on one of the links engaging the curved toothed bar, substantially as shown and described.

2. A potato-planter constructed with a vertically-adjustable standard, 1, extending between the arms 8 of the forked end of pole 3, a plow, 2, at its lower end, a seed-box, 9, at its upper end, with a discharge-chute, 10, and forwardly-projecting frames 4, having their lower portion projecting between the arms 8 of the forked end of a pole, 3, horizontal strips 5, bolted to standard 1 and frames 4, and connected by pivoted links 11 and 14 with arms 8, a curved toothed bar, 20, mounted on one of the arms 8, and a lever-handle, 19, on one of the links 14, engaging the toothed bar 20, substantially as shown and described.

JOHN E. OHLSON.

Witnesses:
CHAS. P. COEY,
E. L. MOORE.